United States Patent [19]

Apelgren

[11] 4,277,255
[45] Jul. 7, 1981

[54] CLEANING PROCESS CONTROL METHOD FOR TEXTILE BARRIER FILTER MATERIAL

[75] Inventor: Roland G. Apelgren, Växjö, Sweden

[73] Assignee: Aktiebolaget Svenska Flaktfabriken, Stockholm, Sweden

[21] Appl. No.: 114,951

[22] Filed: Jan. 23, 1980

[30] Foreign Application Priority Data

Dec. 2, 1979 [SE] Sweden ............................ 7901881

[51] Int. Cl.³ ............................................ B01D 46/04
[52] U.S. Cl. .......................................... 55/20; 55/21; 55/96; 55/270; 55/273; 55/283; 55/284; 55/287
[58] Field of Search ................. 55/20, 21, 96, 270, 55/272, 273, 283, 286, 302, 287, 284

[56] References Cited

U.S. PATENT DOCUMENTS

| | | | |
|---|---|---|---|
| 2,909,239 | 10/1959 | Bennett | 55/213 |
| 3,073,097 | 1/1963 | Hallet et al. | 55/283 |
| 3,267,649 | 8/1966 | Vicard | 55/286 |
| 3,766,715 | 10/1973 | Archer | 55/21 |
| 4,010,013 | 3/1977 | Murayama | 55/286 |
| 4,033,732 | 7/1977 | Axelsson et al. | 55/96 |

FOREIGN PATENT DOCUMENTS

637129 12/1978 U.S.S.R. ............................ 55/283

Primary Examiner—David L. Lacey
Attorney, Agent, or Firm—Dann, Dorfman, Herrell and Skillman

[57] ABSTRACT

A method of controlling the cleaning process for the cleaning of textile barrier filters, for example bag filters, subsequent to dust precipitation on the filter material. The cleaning is carried out with a cleaning system (14) comprising means (16,17,18) for distributing compressed air pulses to the filter bags (4). The gas flow often shows great variations in flow, temperature and dust content, thereby giving rise to problems in the control of the cleaning process in such a manner, that neither over-cleaning nor under-cleaning occurs. For the control, the filter load $v_f$ is measured which is the ratio of the gas flow (m³/s) and the filter area (m²), as well as the pressure drop $p_f$ over the filter material. In applications with great temperature variations of the gas, also the absolute temperature T is measured. The measuring results are processed in an electronic unit (26) for calculating the filter resistance S, which is the ratio $p_f/v_f$, possibly standardized to a reference temperature $T_o$ by multiplication with the ratio $(T_o/T)^\alpha$, where $\alpha$ is a constant with the value 0.76 at gas temperatures below 200° C. Through the filter resistance S the cleaning process is controlled by acting upon the cleaning interval, the time interval between the cleaning pulses, the cleaning pressure of the cleaning pulse, or the duration thereof.

8 Claims, 1 Drawing Figure

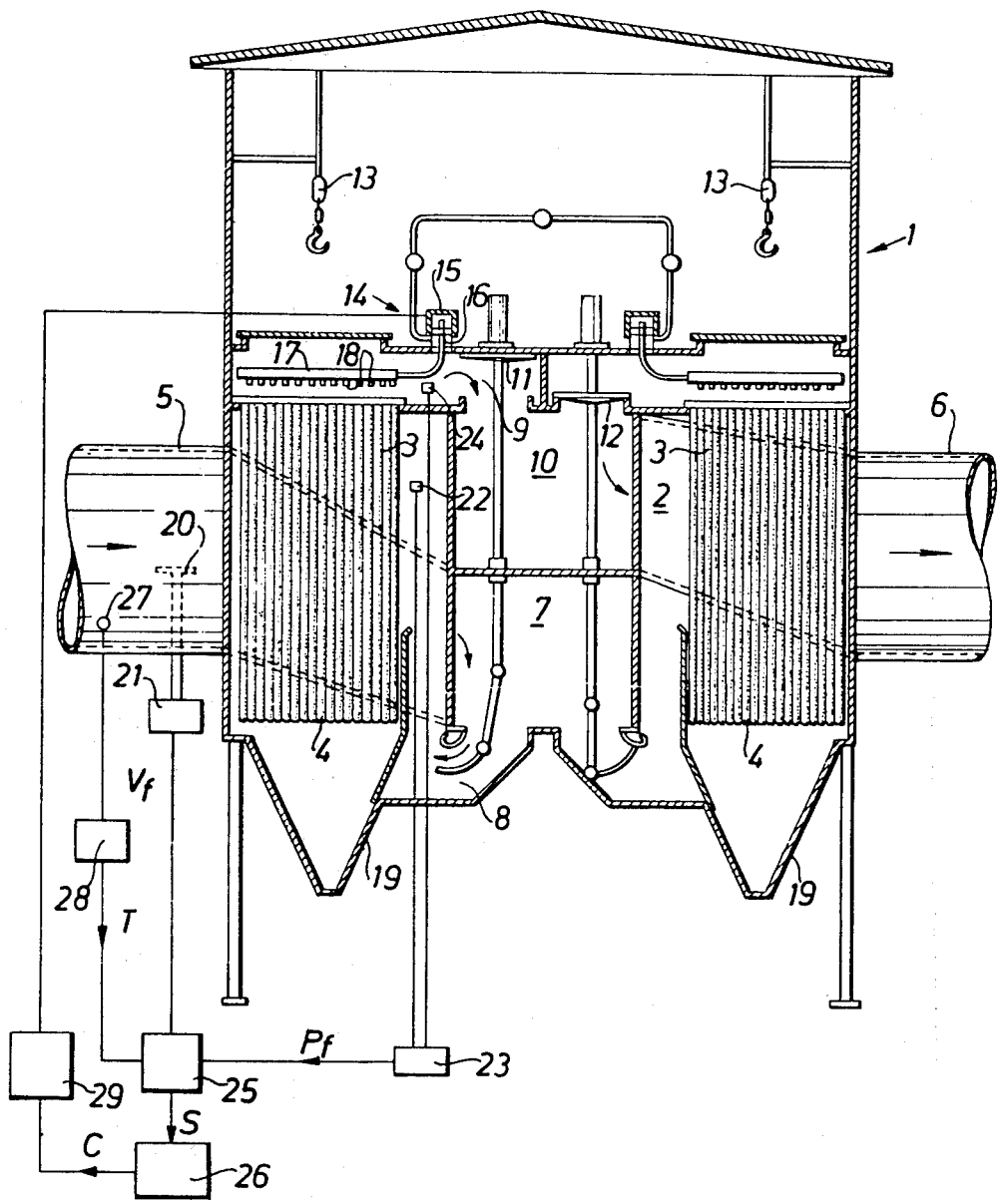

CLEANING PROCESS CONTROL METHOD FOR TEXTILE BARRIER FILTER MATERIAL

This invention relates to a method of controlling the cleaning process of the filter material of textile barrier filters, preferably of the bag filter type, where the polluted gas is supplied to a filter chamber via a crude gas inlet and passes through the filter material mounted in the filter chamber and precipitates dust thereon, and is discharged from the filter chamber via a clean gas outlet, and the cleaning process is effected by exposing the filter material to a compressed air pulse from a cleaning system controlled by a control system.

In a conventional control system, the cleaning system of a bag filter usually is controlled by the flange-to-flange pressure drop in the installation. In said flange-to-flange pressure drop the inlet and outlet dampers as well as the duct losses are included. The cleaning is initiated when a limit value for the flange-to-flange pressure drop is achieved. The cleaning interval, thus, depends on the dust concentration of the gas. The method is adapted well for processes where the operation conditions, i.e. the gas flow, gas temperature and dust concentration are substantially constant.

At varying gas flow and dust concentration, however, the aforesaid control system has the tendency of being controlled to a great extent by the gas flow. From a technical aspect, such control is definitely unsuitable. The flange-to-flange pressure drop at each moment being proportional to the gas flow, the cleaning can be initiated by short-duration flow increases without being conditioned by dust deposits on the bags. The result thereof is over-cleaning, i.e. the dust cake is destroyed, and the filter material is exposed to the gas flow. The emission of dust, as well as the bag wear, and the residual flow resistance of the bag all increase, because the fine dust fraction can more easily penetrate through the exposed filter material.

Also the opposite operation case can occur, i.e. high dust concentration and low gas flow, which results in a considerable growth of the dust cake without initiating cleaning. The increase in dust deposit per se, thus, is not sufficient for achieving at the lower gas flow the limit value, at which the cleaning is initiated. When the gas flow increases, the cleaning is initiated immediately, but then the cleaning effect (pulse pressure) is not adapted to the stronger dust cake. Consequently, several cleaning operations are required for cleaning the filter, implying higher bag wear and shorter life. In extreme cases it may even occur, that the operating level of the installation is shifted to the upper working point with the higher pressure drop and the lower gas flow. The upper working point refers to the point of intersection between the installation curve and, respectively, fan curve of the system. When the installation includes a pulse-cleaned filter, the installation curve assumes the shape of an obliquely upwardly directed parabola, the "tip" of which corresponds to the maximum possible filter flow. When the upper working point has been achieved, the installation must be started again in order to return to the lower working point with the lower pressure drop and the higher load.

It is also known to control the cleaning process of a bag filter by initiating the cleaning pulses at a predetermined time interval, which is adjusted so as to yield the necessary cleaning when operating at maximum load. In this case the control is effected by a timer arrangement.

It is obvious that when the load on the filter is below the maximum load, the system will request cleaning even when there is no cleaning demand. This results in high wear of the filter material and increase in dust emission.

The object of the present invention is to bring about an improved control system, in which the disadvantages of conventional methods are eliminated. This object is achieved by controlling the cleaning in response to changes in the ratio between the pressure drop across the filter material and the flow through the material, or the filter resistance. The invention, thus, is based on the understanding that the cleaning system is to be controlled by the dust deposit on the filter material, usually the filter bags, so that irrespective of variations in the gas flow and dust concentration cleaning always is initiated in response to the same dust deposit on the bags. A suitable method is defined at which the viscosity of the gas is taken into consideration. This is expedient in cases when the gas to be cleaned also shows temperature variations in addition to flow variations. The invention contemplates alternative methods of controlling the cleaning effect of the cleaning system by acting upon the parameters which influence the cleaning effect.

The invention is described in greater detail hereafter, with reference to the accompanying drawing, which is a section through a filter installation.

In the drawing, 1 designates a filter housing with filter chambers 2 arranged therein, in which chambers cassettes 3 or packages comprising a plurality of rows of filter bags 4 are located. The polluted gas to be cleaned is supplied to the filter housing via a crude gas duct 5, and the cleaned gas is led away from the filter housing via a clean air duct 6. Within the filter housing, the crude gas is passed via a duct 7 to the crude gas inlet 8 of the filter chamber and then penetrates through the filter bags 4 while precipitating dust on the surface of the filter material. The cleaned gas is discharged from the clean gas side of the filter chamber via a clean gas outlet 9 to an outlet duct 10 located in the filter housing and connected to the clean gas duct 6. The filter shown comprises a plurality of filter chambers (not shown), which are connected to the common ducts 7 and 10. Damper means 11 and 12 are provided to shut-off the flow through the filter chambers, if necessary, for inspection, filter exchange and the like. For the latter purpose hoisting means 13 are used to lift a cassette out of the filter chamber. The right-hand filter chamber in the FIGURE is shut down by the damper means 12. The left-hand filter chamber is in operation, as is apparent from the position of the damper means 11. The gas flow is indicated by arrows showing the flow direction.

A cleaning device 14 is provided for cleaning the filter bags and comprises in the embodiment shown a pressure tank 15 for cleaning medium, i.e. compressed air, a valve 16 for the supply of cleaning medium to a distribution duct 17, which is provided with jets 18. The mode of operation and the design of the cleaning device shown in the FIGURE are not described in detail here, but are stated to be of the kind disclosed in U.S. Pat. No. 4,033,732. The cleaning is effected by a pressure pulse directed downward in the bag, imparting to the filter material an acceleration and retardation movement, whereby the dust is detached from the filter material and is collected in the dust bin 19. This cleaning method is tested thoroughly, and great knowledge has been gained with respect to the parameters influencing the cleaning effect.

According to the invention, the cleaning system is controlled as follows. The total pressure of the gas and the static pressure are measured by means of a probe 20 disposed in the crude gas duct 5. The dynamic pressure of the gas and its variation with time can be recorded by the pressure transmitter 21. The dynamic pressure being a function of the gas flow, a measure of the gas flow variation, thus, is obtained, and with knowledge of the duct area in question and the total area of the filter material it is possible, by suitable signal processing, to obtain the filter load $v_f$ as the output signal from the pressure transmitter 21. The filter load, thus, can be defined as the ratio between the gas flow (m$^3$/s) and the filter area (m$^2$). In normal applications $v_f$ amounts to between 0.02 and 0.06 m/s.

A pressure-sensing means 22 is provided in the crude gas side (crude gas inlet 8) of the filter chamber, and the pressure sensed is transferred to a pressure transmitter 23. A second pressure-sensing means 24 is provided in the clean gas outlet 9 of the filter chamber, and the pressure sensed also is transferred to the pressure transmitter 23, where the differential pressure $p_f$ is formed and constitutes the output signal from said transmitter. The differential pressure $p_f$, thus, is the pressure drop prevailing over the filter material. In usual applications, $p_f$ varies from 0.75 to 2.5 kPa. The output signals from the pressure transmitters 21 and 23, i.e. $v_f$ and $p_f$, are passed to an electronic unit 25 for further processing. According to the invention, here the filter resistance S is calculated which is defined as the ratio between the pressure drop over the filter material $p_f$ and the filter load $v_f$. Normal values of S are 15 to 50 kPa/(m/s). The output signal S from the electronic unit is passed to a limit value unit 26 where comparison is made with a nominal value So of the filter resistance. From said limit value unit a signal C for filter cleaning is emitted when the filter resistance S has reached the nominal value So which has been set. Said signal C is passed to a control electronic unit 29, which emits the signals required for the cleaning system 14 to carry out the cleaning. A compressed air compressor is started, and an electromechanic valve is actuated which via a pilot valve opens the valve 16 and thereby initiates the cleaning process.

In a great number of process applications the temperature of the gas varies substantially with the time. Hereby also the viscosity of the gas is changed and thereby influences the pressure drop over the filter material without a change having taken place of the dust cake precipitated on the fiber material. As the basic idea of the invention implies that only the size of the dust deposit shall act upon the control of the cleaning system, the invention comprises an appropriate method of compensating for temperature variations, and therewith viscosity variations, of the gas the calculation of the filter resistance by standardizing the temperature relative to a reference temperature To. This is achieved by a temperature-sensing member 27 which senses the temperature of the gas, and via a transmitter 28 transmits the value of the absolute temperature T of the gas to the electronic unit 25. In calculations of the filter resistance S, the ratio $p_f/v_f$ is multiplied with $(T_o/T)^\alpha$, where To is a reference temperature in °K. and T is the prevailing temperature in °K. $\alpha$ is a constant, which at temperatures below 200° C. assumes the value 0.76.

According to the invention, the cleaning process is controlled by acting on one of the parameters which influence the cleaning process, as set forth hereinafter.

The method most obvious for utilizing the invention in practice is to control the cleaning effect by acting upon the cleaning interval or the time interval between the cleaning pulses.

It should be mentioned in this connection, that the cleaning of a cassette with filter bags normally is carried out in sequential cycles one row after the other, and that the term cleaning interval refers to the time which is required from commencing the cleaning of one of the filter rows in the cassette until all filter rows have been cleaned and the next cleaning cycle is commenced. A cleaning cycle, thus, can imply a rapid cleaning throughout the filter package and, thus, the time until the next cleaning interval is controlled. In the other case, the cleanings take place one row after the other and without interruption when the cassette has been cleaned throughout. In this case, instead, the time between the cleaning pulses is acted upon. When a large amount dust is precipitated on the filter material, cleaning will be initiated at short time intervals, and in the case of small amounts of precipitated dust the corresponding time intervals will be long.

As the cleaning effect depends on the pressure of the cleaning medium or cleaning pulse, so that a higher pressure yields a higher cleaning effect than a low pressure, according to an alternative method, the pressure of the cleaning pulse can be acted upon for controlling the cleaning effect. In this case preferably the time interval between the pressure pulses is constant, and prior to every cleaning the system emits a signal, which acts upon the cleaning pressure so that the cleaning pulse which is delivered is just as powerful as required for effecting the necessary cleaning. The control of the pulse pressure can be carried out in different ways, for example by controlling the tank pressure, which will be obvious to the expert. According to a further alternative, the cleaning effect of the cleaning pulse can be controlled by acting upon its duration. When the pulse is interrupted early, a reduced cleaning effect is obtained compared with when the pulse is permitted to develop in its entirety. This can be achieved, purely practically, by varying the duration of the signal C.

The invention is described in greater detail by way of the following example. The experiment was carried out in a bag filter installation where the gas from an electric arc furnace was cleaned. In these installations the gas flow, and also the temperature, vary substantially in operation. The flow through the filter varied between 300,000 Nm$^3$/h and 440,000 Nm$^3$/h, and the temperature varied between 20° C. and 100° C. The filter installation comprised four sections with 336 bags each, and each bag had the length 5 m and the diameter 0.127 m. The total filter area mounted to 2,688 m$^2$. Compared with conventional operation, the method of operation according to the invention resulted in that the mean cleaning interval increased by 33%, from 1.25 to 1.65 minutes. In the case when also the temperature variation of the gas was taken into consideration, the cleaning interval increased additionally from 1.65 to 1.85 minutes.

The advantages gained by utilizing the invention over the conventional prior art can be summarized as follows. The cleaning of the filter bags always takes place in response to a certain dust deposit on the bags, thereby preventing over-cleaning and increased bag wear. The bags hereby have a longer life. The total emission for the filter installation is decreased, because no bags are over-cleaned and there always remains a dust cake on the filter material. Hereby also deep penetration of fine dust into the filter material is prevented which yields a lower residual resistance and thereby a lower mean pressure drop over the filter bags. This implies a substantial energy saving in the form of reduced fan work. The reduced number of cleanings, further, implies a decrease in the energy consumption for the cleaning system proper.

I claim:

1. A method of controlling the cleaning process for the cleaning of the filter material in textile barrier filters where the polluted gas is supplied to a filter chamber via a crude gas inlet and passes through the filter material mounted in the filter chamber and precipitates dust thereon, and is discharged from the filter chamber via a clean gas outlet, and the cleaning process is effected by exposing the filter material to compressed air pulses from a cleaning system controlled by a control system, comprising the steps of measuring the pressure drop $p_f$ over the filter material, measuring the gas flow to determine the filter load $v_f$, which is the ratio between the gas flow and the filter area, computing the filter resistance S, which is the ratio between $p_f$ and $v_f$, and comparing S with a nominal value So of filter resistance, and in response to deviation of S from So, emitting a control signal for controlling the operation of the cleaning system on the filter material.

2. A method as defined in claim 1, including the step of measuring the absolute temperature T of the gas in relation to reference Temperature To, and correcting the measurement of the filter resistance S in response to any viscosity change of the gas.

3. A method as defined in claim 2, wherein the control system provides the correction by multiplying the ratio $p_f/v_f$ by $(T_o/T)^\alpha$, where T and To are temperatures in °K. and $\alpha$ is a constant which at temperatures below 200° C. assumes the value 0.76.

4. A method according to claim 1 wherein the signal from the control system varies the pressure of the cleaning pulses.

5. A method according to claim 1 wherein the signal from the control system varies the duration of the cleaning pulses.

6. A method according to claim 1 wherein the cleaning process is operated in sequential cycles initiated at set time intervals and the control signal varies the set time intervals.

7. A method according to claim 6 wherein each of the cleaning cycles comprises a series of pulses and the intervals are controlled by varying the time between the completion of the series and the start of the next cycle.

8. A method according to claim 6 wherein each of the cleaning cycles comprises a series of pulses and the intervals are controlled by varying the time between pulses.

* * * * *